Sept. 12, 1939. N. S. CAMPBELL 2,172,359
HELICAL SHEAR
Original Filed April 30, 1936
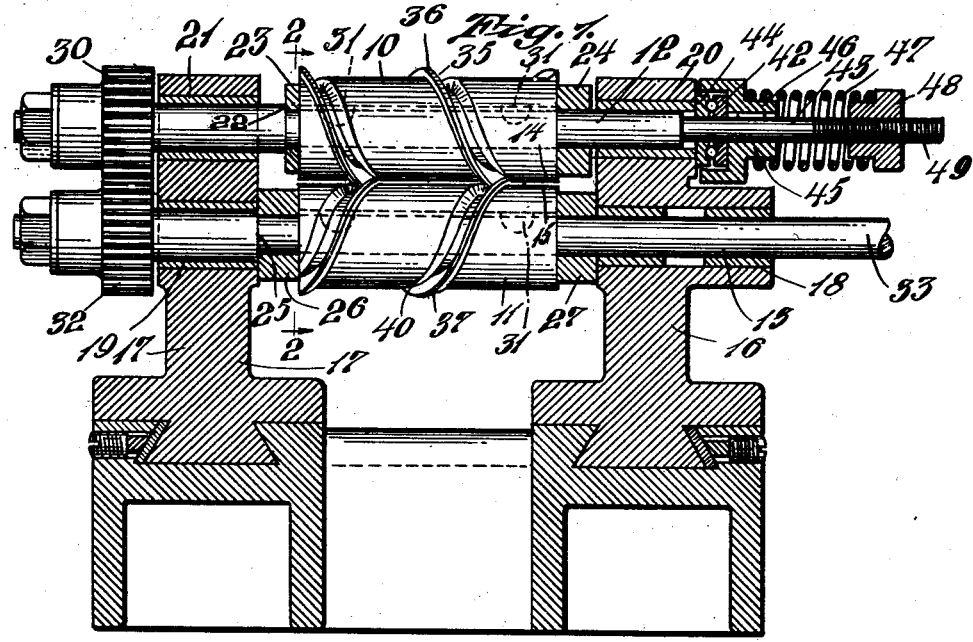
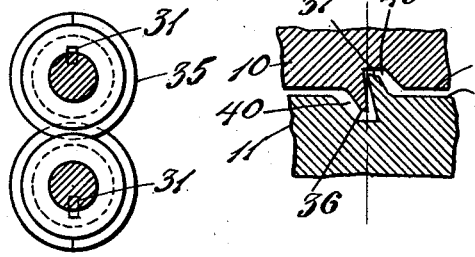
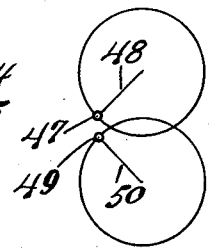
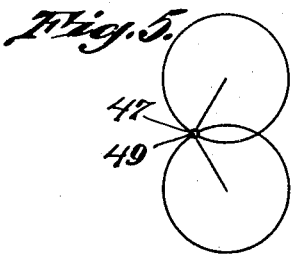
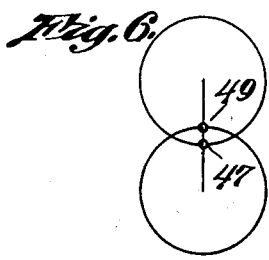
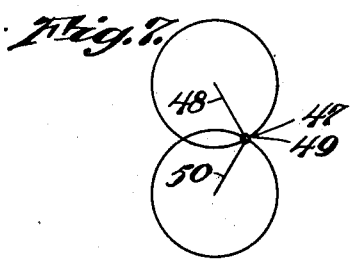
INVENTOR.
Nelson S. Campbell
BY Barlow & Barlow
ATTORNEYS.

Patented Sept. 12, 1939

2,172,359

UNITED STATES PATENT OFFICE 2,172,359

HELICAL SHEAR

Nelson S. Campbell, Brookline, Mass.

Continuation of application Serial No. 77,115, April 30, 1936. This application May 11, 1937, Serial No. 141,957

8 Claims. (Cl. 164—60)

This invention relates to a cutter for severing stocks of various kinds, and is a continuation of my co-pending application, Serial No. 77,115, filed April 30, 1936; and has for one of its objects the provision of a pair of cooperating shearing cutting edges, which will advance with the work while performing their cutting actions.

Another object of the invention is the provision of cutting means which will act more smoothly and at a higher speed than reciprocating cutting means.

Another object of the invention is the provision of cutting means which may at all times engage along some portion of the cutting edge and thus be supported more accurately and more simply than where a shearing cut is performed by reciprocating means, which cannot overlap at all points in the relative movements of the cutters.

Another object of the invention is the provision of rotary cutters which will sever the work diagonally to its direction of passage between them and at the same time so grip the work as to feed the work and prevent the same from moving laterally of its path of travel as it is fed through the cutters.

Another object of the invention is to provide rotary cutters which will have a cutting edge extending from one rotary cutter toward and beyond the work engaging and feeding surface of the other cutter, with a recess formed to accommodate the projecting part of the cutter beyond this engaging and feeding surface, thus enabling cutters to be placed close together for gripping the work.

Another object of the invention is the provision of means which will afford a simple manner of providing a resilient thrust for causing contact of the cutting edges at successive points as they are rotated in unison but in opposite directions.

Another object of the invention is the provision of a cutter which will act diagonally of the work in a very simple and efficient manner, while the work is traveling through the machine so that a continuous operation may be performed.

With these and other objects in view, the invention consists of certain novel features of construction, as will be more fully described, and particularly pointed out in the appended claims.

In the accompanying drawing:

Fig. 1 is an elevation of the cutters with the mounting means for the cutters in section;

Fig. 2 is a section on line 2—2 of Fig. 1;

Fig. 3 is a fragmental sectional view showing the shape of the cutting edges and the relation of the cutting edges one with the other;

Figs. 4 to 7 inclusive, are diagrammatic views showing the action of any two corresponding points on the cutting edges.

In certain operations it is desirable to cause a cutting or severing of certain stock as it is continuously moved in a rectilinear direction for the performance of some operations upon it such as through some machine; and in other instances it is desirable to provide across the width of the work a diagonal cut extending at an angle to the direction of travel of the work without stopping the work as it is processed; and in order to accomplish this result in a simple manner, I have provided a pair of cutters having cutting edges which extend circularly about a member and also axially advance along this member so that as rotation is imparted to the members the cutting edges will move in substantially a transverse direction across the work as it advances. This I have accomplished in a simple manner by providing helical ribs with cutting edges upon a pair of cylinders so arranged that they will contact one with the other as the cylinders are rotated, this being performed by providing helixes with the same pitch but in opposite directions on members geared together to operate in unison with the surfaces of the cylinders so spaced as to grip the work as it passes between the cylinders to both feed the work and prevent it from movement laterally of its direction of travel due to the action of the cutting helixes; and the following is a more detailed description of the present embodiment of this invention, illustrating the preferred means by which these advantageous results may be accomplished:

With reference to the drawing, 10 and 11 represent a pair of rotatable members here shown as cylindrical members, although some other suitable shape may be found to serve equally as well. These members 10 and 11 are mounted to rotate about axes so related that the adjacent portions of the rotary members will be spaced along substantially parallel lines. In the case of cylinders, the axes, here shown as shafts 12, 13 upon which these cylinders 10 and 11 are fixed for rotation, of course also will be parallel. The spaced surfaces 14 and 15 of the cylinders 10 and 11 are spaced such a distance, which may be arranged to be adjusted, as to grip the work sufficiently firmly as to prevent it from movement laterally of its direction of travel, while at the same time feeding between the cylinders, it being essential that considerable grip be had on the work, as the cutters, which will be later described, are found to exert considerable tendency to cause such lateral movement of the work. These shafts 12 and 13 are mounted in spaced supports 16 and 17 by means of bearings 18 and 19 for the shaft 13 and bearings 20 and 21 for the shaft 12. The shaft 12 is reduced to provide a shoulder 22 between which and the end of the cylinder 10 a spacing washer 23 is located. A washer 24 is located between the opposite end of the cylinder 10 and the bearing 20 so that this cylinder is located generally in position between its supports, although the shaft may move axially in its bearings. The shaft 13 is reduced to provide a shoulder 25 and receives a washer 26 between the shoulder and one end of the cylinder 11, which washer also engages support 17, while a washer 27 is provided on the shaft 13 between the other end of the cylinder 11 and the support 16 to locate this cylinder 11 on the shaft 13 and prevent it from axial movement. Each cylinder is keyed to its shaft by a Woodruff key 31, shown in dotted lines. In order that the shafts 12 and 13 may rotate in unison, I have provided a gear 30 fixed on the shaft 12 and a gear 32 fixed on the shaft 13, and I have supplied power to the shaft 13 beyond the end 33 which is broken off. Thus, as one of these gears is driven motion is imparted to the other gear to cause these gears to operate in unison, and as the gears are of the same size the shafts will turn at the same speed so that both cylinders 10 and 11 will move in opposite directions and being of the same diameter their surfaces will operate at the same peripheral speeds.

Upon each of the rotary members 10 and 11 a rib 35 is provided which is ground to provide a cutting edge designated 36 on the cylinder 10 and 37 on the cylinder 11. The rib extends arcuately, and in the showing here presented completely circularly about each of the members 10 and 11 and also advances axially of the member so that in the case of a cylindrical member, such as that shown in the drawing, the rib and cutting edge will be disposed in the form of a true helix, the pitch of which will differ with the timing required. The pitch of the helix formed on the member 10 will be equal to the pitch of the helix formed on the member 11, but these helixes will have opposite pitches when both are viewed from any one point. That is, if viewed from the gear end of the members the helix of the member 10 will advance clockwise, while the helix of the member 11 will advance counter-clockwise. The cutting edges on the ribs will be oppositely disposed. That is, the cutting edge 36 of the helical rib 35 on the member 10 will be beveled toward the gear, while the cutting edge 37 on the rib 35 of the member 11 will be beveled on the side away from the gear. These cutting edges are so disposed that they will contact and overlap in their movement one by the other through a considerable extent. In fact, in order that the surfaces 14 and 15 of the cylinders may be so closely related as to grip the work, it is desirable to provide a recess 40 in each of the cylinders 10 and 11 adjacent the rib 35 and on the side of the rib 35 with which the cutting edge of the companion cylinder contacts so as to accommodate this rib and its cutting edge, allowing it to have such extent as may be desired for grinding to sharpen without interfering or contacting or being limited by the cylindrical surface which contacts the work, this recess being insufficient to deprive the cylindrical surface of the amount of grip desired on the work.

In order that these cutting edges may be maintained in firm contact, the member 11 is supported against axial movement, as above described, while the member 10 may be axially moved and a resilient means is provided for this purpose. A ball bearing 42 is positioned on the reduced portion 43 of the shaft 12 having one surface 44 contacting with the bearing 20, while a collar 45 contacts with the other surface of the ball bearing and is keyed to the portion 43 of the shaft 12 as at 46 so as to turn therewith. The coil spring 47 encircles this portion 43 of the shaft and engages the collar 45, while a nut 48 on the threaded portion 49 of this shaft engages the spring 47 and by turning up this nut a thrust is obtained against the bearing 20 of the support 16 through this ball bearing mounting so as to draw the shaft axially to the right in Fig. 1 and urge the cutting edges resiliently into engagement.

In view of the fact that the ribs 35 overlap each other in the space between the rotatable members 10 and 11 there will be a shearing action between corresponding engaging points on the cutting edges 36 and 37; and in order that the cutting edges will contact only at their points of first meeting or leaving each other I undercut the ribs 35, as shown in section in Fig. 3.

This cutting action or shearing action will be readily apparent by reference to Figs. 4, 5, 6 and 7. If I should select any point on the cutting edge, say for instance 47 on the cutting edge 36, I will know that this point 47 must travel in the path of a true circle about the axis of the shaft 12 in a plane at right angles to the shaft 12. I will let such a point be represented by 47, Fig. 4, at the end of the radius line 48. If I select another point 49 on the cutting edge 37 in substantially the same plane as the point 47, I know that this point 49 will also travel in a circle in a single plane which will be at right angles to the axis of shaft 13 and will be in the same plane as the travel of the point 47. I will let this point be represented as 49, Fig. 4, at the end of radius 50. Now as the members 10 and 11 rotate, the points 47 and 49 will approach each other until they contact, as shown in Fig. 5, after which these points will pass one by the other to perform a shearing cut and be represented as shown in Fig. 6, they being out of contact by reason of undercuts of the rib, see Fig. 3. The points will then pass again into contact as shown in Fig. 7, as they again pass each other to enter the inactive portion of their travel and then again pass through the cycle to again have the relative positions shown in Figs. 4, 5, 6 and 7, just previously described.

The arbitrarily selected points 47 and 49 are representative of every point along the ribs or cutting edges, and thus it will be apparent that for one point or for every point there is a corresponding movement of a point on the other cutter so that these points pass each other as they are rotated just as if the corresponding points were rotating in planes which would just pass each other, but, of course, as these progressive points along the edge are at different positions along the axis, a progressive cut is performed as the stock or work is moving forwardly between the rotary members 10 and 11. As the cut is performed while the work is advancing between the axes of the cutter a diagonal cut across the stock or work with reference to the line of travel is had.

Cutters of this character may be utilized for various purposes for cutting braids, fabrics of any sort or for cutting textile fibers such for instance as shown in my co-pending application, Serial No. 62,418, filed Feb. 5, 1936.

I have not attempted to describe in detail the construction of the cutter as this may be formed by cutting down stock to leave the rib and cutting edge raised on the cylindrical member or by insetting a rib either as a strip or in section into a groove in a cylindrical or other member or in other ways as the mechanic may choose to construct.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A cutter comprising a pair of rotary members, each provided with a cutting edge disposed circularly about the member and at the same time advancing axially of the member, said cutting edges contacting progressively along their length as the members are rotated in unison, each member also having a body portion presenting a work contacting surface inwardly from its cutting edge, the work contacting surfaces of said members being so spaced as to grip the work sufficiently to prevent movement of the work laterally of its path of travel as it feeds through said members.

2. A cutter comprising a pair of members having helically disposed cutting edges, each rotatably mounted and positioned to contact one with the other along their length as rotated, each member also having a body portion presenting a work contacting surface inwardly from its cutting edge, the work contacting surfaces of said members being parallel at their point of engagement with the work and so spaced as to grip the work sufficiently to prevent movement of the work laterally of its path of travel as it feeds through said members.

3. A cutter comprising a pair of rotary members, each provided with a cutting edge disposed circularly about the member and at the same time advancing axially of the member, said cutting edges contacting progressively along their length as the members are rotated in unison, each member also having a body portion presenting a work contacting surface inwardly from its cutting edge, the work contacting surfaces of said members being recessed adjacent the cutting edge to receive the cutting edge of the companion member.

4. A cutter comprising a pair of rotary members, each provided with a rib having a cutting edge, said ribs being disposed circularly about the member and at the same time advancing axially of the member, said cutting edges contacting progressively along their length as the members are rotated in unison, each member also having a body portion presenting a work contacting surface inwardly from its cutting edge, the work contacting surfaces of said members being parallel at their point of engagement with the work and so spaced as to grip the work sufficiently to prevent movement of the work laterally of its path of travel as it feeds through said members, said work engaging surface being recessed adjacent the cutting edge to receive the rib and its cutting edge of the companion member.

5. A cutter comprising a pair of rotary members, each provided with a cutting edge disposed circularly about the member and at the same time advancing axially of the member, said cutting edges contacting progressively along their length as the members are rotated in unison, and an arrangement whereby said members are urged relatively axially to maintain said cutting edges in contact.

6. A cutter comprising a pair of rotary members, each provided with a cutting edge disposed circularly about the member and at the same time advancing axially of the member, said cutting edges contacting progressively along their length as the members are rotated in unison, and yielding means urging said cutting edges into contact by a relative axial movement of said members.

7. A cutter comprising a pair of members having helically disposed cutting edges, each rotatably mounted and positioned to contact one with the other along their length as rotated, and yielding means urging said cutting edges into contact by a relative axial movement of said members.

8. A cutter comprising a pair of rotary members, a rib on each member disposed circularly about the member and at the same time advancing axially of the member, the ribs on said members contacting at progressively advancing points as the members are rotated in unison, and the spring means acting axially on one of said members to urge said ribs into contact.

NELSON S. CAMPBELL.